Aug. 6, 1963  J. H. BOICEY ETAL  3,100,173
APPARATUS FOR PRESSING GLASS-PLASTIC SANDWICHES
Filed Dec. 13, 1957  2 Sheets-Sheet 1

INVENTORS
James H. Boicey and
BY Frederick E. Henning

Nobbe & Swope
ATTORNEYS

Aug. 6, 1963  J. H. BOICEY ETAL  3,100,173
APPARATUS FOR PRESSING GLASS-PLASTIC SANDWICHES
Filed Dec. 13, 1957  2 Sheets-Sheet 2

INVENTORS
James H. Boicey and
BY Frederick E. Henning
Nobbe & Swope
ATTORNEYS

3,100,173
APPARATUS FOR PRESSING GLASS-PLASTIC SANDWICHES

James H. Boicey and Frederick E. Henning, Toledo, Ohio, assignors to Libbey-Owens-Ford Glass Company, Toledo, Ohio, a corporation of Ohio
Filed Dec. 13, 1957, Ser. No. 702,707
5 Claims. (Cl. 156—579)

This invention relates broadly to laminated safety glass, and more particularly to improvements in preliminarily pressing assembled sheets of glass and plastic together in the production of such laminated glass.

Briefly stated, laminated safety glass is made up of two or more sheets or plates of glass with an interposed layer or layers of non-brittle plastic material, all bonded together under the influence of heat and pressure to form a composite, transparent structure. In the manufacture of this type of glass, it is customary to first assemble the various layers or laminae in proper superimposed relationship to form a sandwich of glass and plastic; to then prepress the assembly to drive out entrapped air and moisture from between the various layers and to give preliminary adhesion; and then to finally integrally bond the several layers together by subjecting the prepressed assembly to the combined action of heat and elevated pressure in an autoclave.

Heretofore, roll-type presses having rubber-surfaced rolls have been widely used to prepress the so-called "sandwich." Such roll-type presses have been found quite satisfactory even in the manufacture of bent laminated safety glass including the so-called "panoramic" windshields which are quite severely curved to provide vision at the forward corners as well as across the front of the car.

However, with the further streamlining of automobiles, these panoramic windshields have lately been redesigned to extend upwardly and then sweep back in a smooth curve that blends into the roof panel of the car to produce what is now aptly termed a "cap" windshield. Such an extreme windshield construction involves severe bends about both major axes of the glass sheets from which it is produced. In other words, the usual longitudinal bends about the transverse axis of the sheets are necessary to form the centrally disposed shallow curvature and the sharply curved end sections as in the prior panoramic windshields. In addition, a severe bend about the longitudinal axis of the sheets is required to form the curvature of the so-called "cap" portion; and this makes the prepressing of such windshields in known roll-type presses a virtual impossibility.

The chief aim of this invention is therefore to provide an improved procedure and apparatus for pressing a glass-plastic assembly that includes relatively severe curvatures in both of its axes.

Another object is to provide a preliminary pressing apparatus which includes an improved form of retaining and evacuating means designed to facilitate glass-plastic assemblies being prepressed by atmospheric pressure.

Another object of the invention is to provide a pressing apparatus of the above character which facilitates heating of the glass-plastic assembly during application of the atmospheric pressure.

Another object is to provide a flexible ring-type member for use in pressing glass-plastic assemblies that are curved in both of their axes and which member acts to firmly and sealingly grip the peripheral edge of such an assembly during the development of an evacuated condition therebetween.

Another object of the invention is to provide a flexible preliminary pressing ring that is adapted to be freely moved over the edge of a glass-plastic assembly while in an expanded condition and to clampingly grip the said assembly when in a collapsed condition.

A more specific object is the provision of an endless ring-type member for use in pressing glass-plastic assemblies that is substantially H-shaped in cross section to provide a continuous, inwardly disposed edge-receiving channel and outwardly disposed finger means which act, when compressed, to progressively expand said channel to receive the peripheral edge of a glass-plastic assembly and, when released, to permit the channel to grip said peripheral edge and to maintain an evacuated condition around the peripheral edge.

Other objects and advantages of the invention will become more apparent during the course of the following description when read in connection with the accompanying drawings.

In the drawings, wherein like numerals are employed to designate like parts throughout the same:

Figure 1:
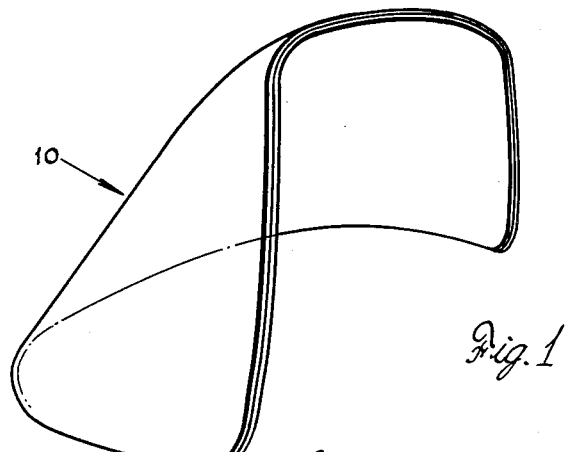
FIG. 1 is a perspective view of a laminated glass-plastic "cap" windshield with which this invention is adapted to be used.

Briefly stated, in practicing the invention illustrated in the drawings to prepress a laminated safety glass assembly, the special flexible, channeled member or ring of the invention is first fitted in sealing relation around the periphery of the sandwich to be prepressed. By then creating a vacuous condition within the channeled member, entrapped air and residual vapors are exhausted from between the several layers of the sandwich. This operates to bring the surfaces of the plastic interlayer into more intimate relation with the opposed glass surfaces and to reduce the pressure within the assembly to a point where the atmosphere will exert sufficient pressure on the outside surfaces of the sandwich to preliminarily press the several layers together.

Referring now more particularly to the drawings, there is shown at 10 in FIG. 1 a form of the so-called "cap" windshield which has already been described.

Figure 2:
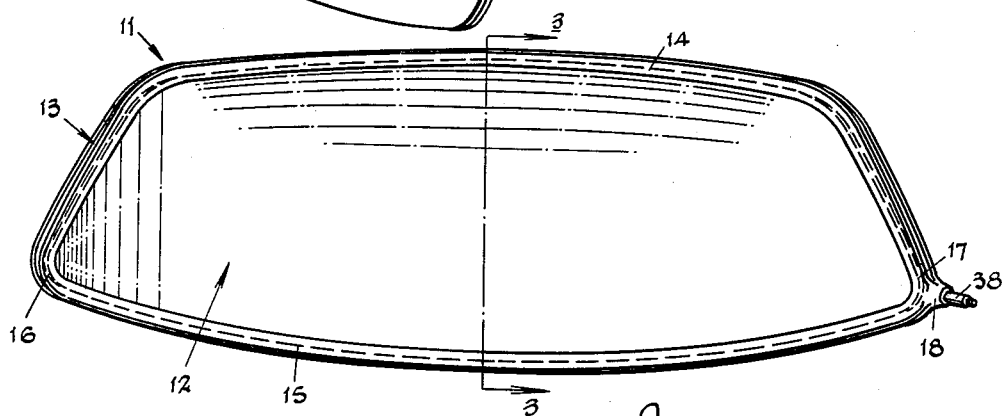
FIG. 2 is a plan view of the glass-plastic assembly for the windshield of FIG. 1, showing the pressing apparatus of the invention mounted thereon.
Figure 3:
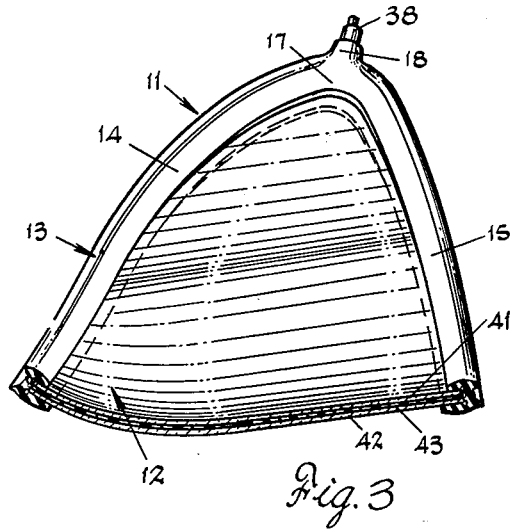
FIG. 3 is a transverse sectional view taken on line 3—3 of FIG. 2.

The special type of flexible ring is shown at 11 in FIGS. 2 and 3 as positioned around the periphery of glass-plastic laminae or sandwich 12. The ring is preferably of an extruded rubber formation which has a suitable hardness of between 70 to 75 durometer and is conventionally produced in an endless form by being vulcanized in a mold substantially of the same outline as the windshield with which it is to be used. The ring 11 thus may be said to enclose a generally trapezoidal area by means of a generally U-shaped top and side portion 14 and a curved bottom portion 15 (FIG. 2). In the formation of the endless ring 11, these two portions are integrally united as at 16 and 17 and the area 17 may be provided with an outwardly projecting boss 18 for a purpose to be herein particularly described.

Figure 4:
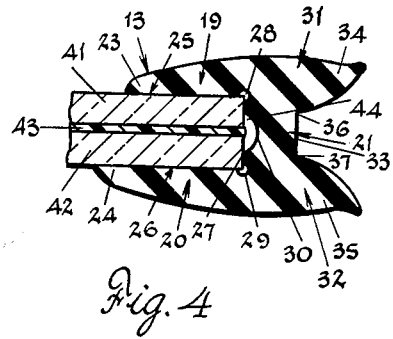
FIG. 4 is a cross-sectional detail view taken on line 4—4 of FIG. 2.
Figure 5:
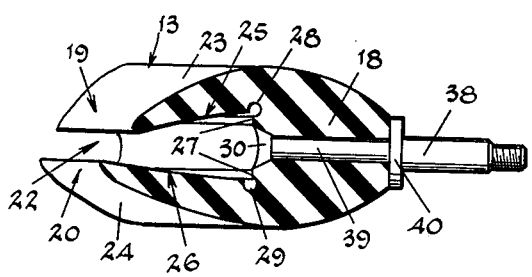
FIG. 5 is a cross-sectional detail view through the evacuating valve of the pressing apparatus.
Figure 6:
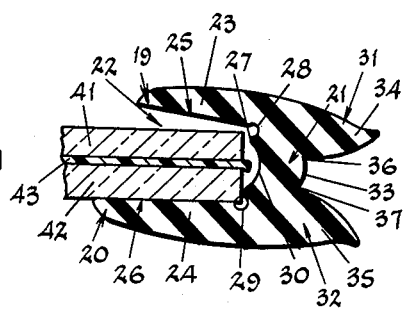
FIG. 6 is a schematic sectional view similar to FIG. 4 but showing the edge of a glass-plastic sandwich being introduced into the channel of the pressing apparatus.

The body portion 13 of ring 11 as shown in FIGS. 4 and 6 is preferably of substantially H-shape in cross section having substantially endless ribs or legs 19 and 20, that are parallel to one another and an inter-related web 21. The legs 19 and 20 are thus disposed to form a sandwich-receiving channel 22 by the two inwardly directed leg sections 23 and 24 that project from the relatively thick or rigid web portion 21. As seen in FIGS. 4 to 6, the leg section 24 is longer than the opposite leg section 23. More especially, the channel 22 is defined by the two opposed wall surfaces 25 and 26 of the leg sections 23 and 24 and a rear or inwardly disposed wall surface 27 defined by the surface of the web 21. The plane of the surface 27, in use, is substantially normal to either of the wall surfaces 25 or 26. The corners formed by the rear wall 27 with each of the wall surfaces 25 and 26 are relieved by susbtantially circular grooves 28 and 29 that are adapted to afford greater flexibility of movement of either of walls 25 or 26 relative to the wall surface 27. This wall is further provided with a semi-circular groove 30 for purposes to be hereinafter more fully disclosed.

The outwardly directed sections 31 and 32, respectively, of the legs 19 and 20 and the outer surface 33 of the web 21 are formed to provide continuous and outwardly projecting, operating fingers or ribs 34 and 35. It is also to be noted that the outer wall surface 33 of the web 21 is shorter than the related inner wall surface 27 thereof. That is to say, the distance between the points of juncture 36 and 37 of the ribs 34 and 35 and surface 33 is of a lesser span than the distance or span of the wall surface 27 between the grooves 28 and 29.

In the boss 18, there is contained a valve member 38 in communication generally with the channel 22. In FIG. 5, it will be seen that the stem 39 of valve member 38 is embedded in and projects through the web 21 and that a flange 40 is provided thereon which abuts the outer surface of the boss 18. This flange is adapted to prevent the valve member 38 being accidently forced inwardly which, during use of the ring 11, might damage the adjacent edges of the sandwich should the inner end of the member be struck thereagainst. The valve member 38 is conventionally adapted to be externally connected to a source of vacuum as will be presently more clearly set forth.

The glass-plastic laminae 12 consist of two glass sheets 41 and 42 and a plastic interlayer sheet 43 which are assembled in a suitably conditioned room and are then ready for assembly with a ring 11 for prepressing. For this purpose, the outwardly directed leg sections or operating ribs 34 and 35 are adapted to be suitably engaged and directively urged toward one another in a substantially clamped relation, as by manual engagement or otherwise. This action is absorbed by the resilient character of the web 21 and is reflected in the separation of the inwardly directed leg sections 23 and 24 which is facilitated by the circular grooves 28 and 29. More particularly, when the ribs 34 and 35 are urged toward one another, there is a definite fulcrum action occurring at the points of juncture 36 and 37 with a consequent distortion or opening up of the grooves 28 and 29. The legs 23 and 24 are thus caused to separate substantially as shown in FIG. 6.

In inserting a sandwich to be pressed in the ring 11, the sides 14 and 15 of the ring are arranged with the channel 22 directed, as closely as possible toward the edge of the sandwich 12, that is intended to be received. The ends 16 and 17 of the ring are now positioned at the extreme end areas of the sandwich or assembly 12. As the outermost areas of the ribs 34 and 35 in the vicinity of the ends 16 and 17 are urged together, the legs 23 and 24 are opened or spread apart in the two oppositely disposed areas and this relation can be easily held when the longer leg 24 is moved into surface engagement with the glass sheet 42 as shown in FIG. 6. In fact, as is apparent here, the wall surface 26 of leg 24 serves as a thrust area and the relief groove 29 between said surface and wall 27 functions as a further fulcrum point about which the web 21 can be flexed to further spread the leg 23 outwardly. Working inwardly toward the central area of the sandwich 12 and from the extreme end areas 16 and 17, the edges of said sandwich are progressively fitted into the continuous channel 22 and between the legs 23 and 24, until the assemblage appears as illustrated in FIGS. 3 and 4.

As the positioning of the ring 11 continues about the periphery of the sandwich 12, the engaged areas of the fingers or ribs 34 and 35 are progressively released and this causes the legs 23 and 24 to collapse and, by moving inwardly or toward one another, to actively clamp or grip the outer surfaces of the glass sheets 41 and 42. By reason of the conformity of the flexible molded ring 11 to the outline of the laminae 12 as well as the bent curvature thereof, the surfaces 25 and 26 of the legs 23 and 24 are adapted to provide an effective and substantially complete seal thereabout. At the same time the perpendicular edges of glass sheets 41 and 42 are disposed in substantially abutting relation with the channel wall surface 27 and so as to definitely create a closed chamber 44 at the groove 30. The valve member 38 is then connected to a source of vacuum as by the tubing 45.

After the completeness of seal of the ring 11 is carefully inspected and the degree of evacuation in chamber 44 is in the order of 22 or more inches of mercury, a preliminary period of evacuation is carried out for approximately one minute during which interval entrapped air and moisture are withdrawn from between the layers of glass and plastic. Also during this period residual vapors and their pressures are withdrawn from the thermoplastic material. Although an optimum condition would be the reduction of pressure within the glass-plastic sandwich to zero, such a condition is of course never achieved but a sufficient differential between the outside atmospheric pressure and that within the unit can be obtained to provide a positive and equalized pressing action against the outer surfaces of the glass sheets. The sandwich of glass sheets and plastic interlayer under pressure are then heated as in a conventional oven or in a hot bath.

Figure 7:
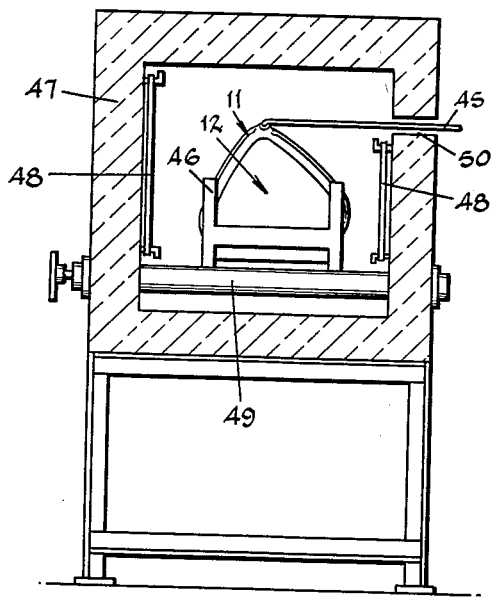
FIG. 7 is a transverse vertical detail view of one form of heating oven.

For purposes of illustration, the ring and sandwich assembly is here shown as being placed upon a suitable rack 46 and passed through an oven 47 (FIG. 7). Such an oven may be of the tunnel type and heated by suitable electric units 48. The rack 46 is placed on a roll conveyor 49 which is driven at a convenient rate of speed such as 19 f.p.m. or so that the laminae will be subjected to a heated atmosphere of approximately 600° F. for substantially two and one-half minutes. If desired, although not necessarily, one wall of the oven 47 may be provided with an elongated, horizontally disposed opening or slot 50 through which the tubing 45 to the vacuum source can be passed during movement of the rack and supported laminae through the oven.

During the heating cycle, the sandwich 12 is continuously influenced by the vacuous condition therein and, as the thermoplastic interlayer becomes softened and somewhat tacky, it is caused to freely adhere to the opposed glass surfaces. Since a differential of pressure is still existent during this interval, the normal atmosphere pressure acting upon the outer surfaces of the glass sheets is adapted to substantially press the glass sheets into complete contact with the softened interlayer throughout their surface areas of contact. Upon completion of the heating cycle, the vacuous condition is maintained for a further interval of about one minute. The preliminary pressing of the glass-plastic laminae will now be evidenced by the more or less reduced translucent appearance thereof and the vacuum connection is discontinued at the valve member 38. The ring 11 is then removed and, for rapid disengagement, the legs 23 and 24 can be spread apart by engagement of the ribs 34 and 35.

Figure 8:
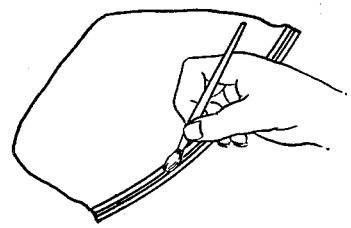
FIG. 8 is a fragmentary perspective view of an edge treating operation in the laminating process.

The laminae are now ready for the final pressing operation which is conventionally carried out in an autoclave by the action of heated oil under pressure and, to prepare for this, it has been found advantageous to coat the edges of the prepressed sandwich with a swelling or sealing solution such as tributylphosphate. Such a procedure, it has been found, can be easily and effectively carried out by brushing on of the solution as shown in FIG. 8, which acts upon the exposed border of the interlayer to cause a swelling thereof to substantially seal the surfaces of the plastic to the adjoining edges of the glass sheets thus operating to prevent the entry of oil into and between the glass and plastic layers.

After removal from the glass-plastic sandwich, the edge ring 11 is adapted to be returned to the area where the pressing cycle began, and where it is available for reuse.

It is to be understood that the form of the invention herewith shown and described are to be taken as illustrative embodiments only of the same, and that various changes in the shape, size and arrangement of parts may be resorted to without departing from the spirit of the invention or the scope of the subjoined claims.

We claim:

1. An apparatus for pressing together the glass and plastic sheets of glass-plastic sandwiches, comprising an endless ring-type member of resilient material for surrounding a glass-plastic sandwich, said ring-type member having a body portion including a web portion, a pair of substantially parallel legs extending inwardly from said web portion to form a continuous channel for receiving the peripheral margin of a glass-plastic sandwich, a continuous groove recessed into said web portion between said legs and in open communication with said channel, means extending outwardly from said web portion responsive to pressure applied thereon to outwardly distort said legs and open said channel, and means communicating with said groove for evacuating air from the space defined by said groove and the marginal edge of a glass-plastic sandwich when secured in the channel.

2. An apparatus as defined in claim 1, wherein said outwardly extending means comprises a pair of oppositely disposed continuous ribs formed integrally with said web member.

3. An apparatus as defined in claim 1, wherein said body portion is substantially H-shaped in cross-section.

4. An apparatus as defined in claim 1, in which one of said legs is longer than the other to thereby provide a thrust area to facilitate the outward distortion of said other leg.

5. An apparatus as defined in claim 1, wherein continuous relief grooves are formed within said channel at the junctures of the surface of the web portion with the associated surfaces of said leg portion.

References Cited in the file of this patent

UNITED STATES PATENTS

| | | |
|---|---|---|
| 1,734,379 | Hitchcock | Nov. 5, 1929 |
| 1,870,284 | Drake | Aug. 9, 1932 |
| 2,357,538 | Paddock | Sept. 5, 1944 |
| 2,466,078 | Boicey | Apr. 5, 1949 |
| 2,569,955 | Schassberger | Oct. 2, 1951 |
| 2,625,715 | Beck | Jan. 20, 1953 |
| 2,687,555 | Anspon et al. | Aug. 31, 1954 |
| 2,759,575 | Marvin | Aug. 21, 1956 |
| 2,768,411 | Clingman | Oct. 30, 1956 |
| 2,772,915 | Renno | Dec. 4, 1956 |
| 2,948,645 | Keim | Aug. 9, 1960 |

FOREIGN PATENTS

| | | |
|---|---|---|
| 562,395 | Great Britain | June 29, 1944 |